(12) United States Patent
Hertan

(10) Patent No.: US 8,360,446 B1
(45) Date of Patent: Jan. 29, 2013

(54) WHEELED FIREARMS TRANSPORT CASE

(76) Inventor: Bernard A. Hertan, College Station, TX (US)

(*) Notice: Subject to any disclaimer, the term of this patent is extended or adjusted under 35 U.S.C. 154(b) by 12 days.

(21) Appl. No.: 13/189,066

(22) Filed: Jul. 22, 2011

(51) Int. Cl.
*B62B 3/10* (2006.01)

(52) U.S. Cl. ............... 280/47.35; 280/47.371; 280/79.3

(58) Field of Classification Search ............... 280/79.3, 280/47.35, 35, 655.1, 142.11, 47.34, 47.371, 280/79.11, 79.2; 206/317; 312/290, 249.8; 211/64
See application file for complete search history.

(56) References Cited

U.S. PATENT DOCUMENTS

| | | | | |
|---|---|---|---|---|
| 1,202,588 A * | 10/1916 | Roberts | | 312/237 |
| 1,654,616 A * | 1/1928 | Spann | | 312/204 |
| 1,668,659 A * | 5/1928 | Rodgers et al. | | 312/310 |
| 1,839,051 A * | 12/1931 | Prucha et al. | | 312/21 |
| 1,932,638 A * | 10/1933 | Rogers | | 206/317 |
| D126,088 S * | 3/1941 | Clouse | | D6/436 |
| 2,531,550 A * | 11/1950 | Bradley et al. | | 206/317 |
| 2,623,639 A * | 12/1952 | Levy | | 211/4 |
| 3,031,069 A * | 4/1962 | Hirsch | | 206/317 |
| 3,558,205 A * | 1/1971 | Mueller | | 12/209 |
| 3,848,940 A * | 11/1974 | Berens | | 312/135 |
| 4,976,450 A * | 12/1990 | Ellefson | | 280/79.11 |
| 5,299,722 A * | 4/1994 | Cheney | | 224/404 |
| 5,454,931 A * | 10/1995 | Lauve, Jr. | | 206/317 |
| 5,482,162 A * | 1/1996 | Dickinson | | 206/373 |
| 5,590,940 A * | 1/1997 | Richard | | 312/287 |
| 5,634,649 A * | 6/1997 | Breining et al. | | 280/47.35 |
| 5,758,933 A * | 6/1998 | Clendening | | 312/205 |
| 5,772,295 A * | 6/1998 | Sundmark | | 312/246 |
| 6,042,207 A * | 3/2000 | Crosby et al. | | 312/351 |
| 6,547,070 B1 | 4/2003 | Kolpin | | |
| 6,601,680 B2 | 8/2003 | Japchen | | |
| 7,159,711 B1 | 1/2007 | Gardner | | |
| 7,281,346 B1 | 10/2007 | Cook et al. | | |
| 7,500,572 B2 * | 3/2009 | Lane et al. | | 211/64 |
| 7,524,002 B2 * | 4/2009 | Punzel et al. | | 312/217 |
| 7,726,478 B2 * | 6/2010 | Potterfield et al. | | 206/317 |
| 8,157,337 B2 * | 4/2012 | Manalang et al. | | 312/249.8 |
| 8,210,548 B1 * | 7/2012 | Agyemang | | 280/47.35 |
| 2004/0140280 A1 * | 7/2004 | Cleveland et al. | | 211/64 |
| 2005/0045510 A1 * | 3/2005 | Marks | | 206/373 |
| 2005/0133473 A1 * | 6/2005 | Lesperance | | 211/64 |
| 2005/0194872 A1 * | 9/2005 | Cleveland et al. | | 312/290 |
| 2006/0065560 A1 * | 3/2006 | Dickinson et al. | | 206/317 |
| 2006/0283820 A1 * | 12/2006 | Peters et al. | | 211/64 |
| 2007/0024165 A1 * | 2/2007 | Moulton | | 312/291 |
| 2008/0203860 A1 * | 8/2008 | Myers | | 312/204 |
| 2008/0296331 A1 * | 12/2008 | Klosk | | 224/547 |

* cited by examiner

*Primary Examiner* — Katy M Ebner
*Assistant Examiner* — Emma K Frick

(57) ABSTRACT

A wheeled firearms transport case having an interior compartment having a locking lid and a locking access door for access to rifles stored therein, locking drawers with removable cushioned inserts for the storage of handguns, ammunition, and rifle scopes, and a plurality of removable cushioned inserts disposed on the left side of the case for the storage of firearm accessories with a locking access door. A cushioned rifle butt cradle member, a rubber guide support, and a hook and loop strap are disposed within the interior compartment to secure each rifle within the interior compartment.

13 Claims, 6 Drawing Sheets

WHEELED FIREARMS TRANSPORT CASE

BACKGROUND OF THE INVENTION

Various types of carrying cases for firearms are known in the prior art. However, what is needed is a wheeled firearms transport case including an interior compartment having a locking lid and a locking access door for access to rifles stored therein, locking drawers with removable cushioned inserts for the storage of handguns, ammunition, and rifle scopes, and a plurality of removable cushioned inserts disposed on the left side of the case for the storage of firearm accessories with a locking access door. A cushioned rifle butt cradle member, a rubber guide support, and a hook and loop strap are disposed within the interior compartment to secure each rifle within the interior compartment.

FIELD OF THE INVENTION

The present invention relates to carrying cases, and more particularly, to a wheeled firearms transport case.

SUMMARY OF THE INVENTION

The general purpose of the present wheeled firearms transport case, described subsequently in greater detail, is to provide a wheeled firearms transport case which has many novel features that result in a wheeled firearms transport case which is not anticipated, rendered obvious, suggested, or even implied by prior art, either alone or in combination thereof.

To accomplish this, the present wheeled firearms transport case includes a housing having a front side, a rear side, a substantially L-shaped left side, a substantially L-shaped right side, a bottom side, and a top side that extends from the front side to a central horizontal axis extending from the left side to the right side. Vertically aligned drawers having front walls on the front side of the housing are slidingly disposed within the housing. Each of a cushioned first insert having a plurality of first cavities therein to removably receive ammunition boxes, a cushioned second insert having a plurality of second cavities therein to removably receive handguns therein, and a cushioned third insert having a plurality of third cavities therein to removably receive a rifle scope therein, is removably disposed within one of the drawers thus permitting interchangeability as well as removal while protecting the contents thereof. A retractable first handle retracts into an exterior compartment disposed on the housing rear side proximal to a lid thus allowing exposure of the first handle to roll the apparatus to a desired location while also allowing retraction to prevent breakage of the first handle while the present apparatus is in a fixed position with the rear side exposed, rather than against a wall. An interior compartment covered by a lid is disposed within the housing between the drawers, the housing rear side, the left side, the right side, and the lid. A cushioned rifle butt cradle member, including a parallelepiped body having a notch disposed therein, is disposed within the interior compartment between the housing bottom side and the rear side to removably receive a rifle butt therein thereby protecting the rifle butt from damage during transport and assisting in securing the rifle in an upright position within the interior compartment. At least one cushioned guide support, having an external wall attached to the housing rear side and an internal wall configured to abut a rifle barrel, is disposed within the interior compartment. In addition, at least one hook and loop strap, having an outer edge attached to the housing rear side and a inner edge that engages the outer edge, is disposed within the interior compartment to further stabilize a rifle inn an upright position by releasly retaining a rifle barrel therethrough. An elongated interior cavity is disposed within the housing left side between the interior compartment forward wall and the housing front side. Vertically aligned cushioned fourth inserts having a plurality of slits therein are removably disposed within the interior cavity. The slits vary in length to accommodate various firearm accessories such as targets, tools, eye protectors, and ear protectors. A first access door is hingedly disposed on the housing left side proximal to the front side and the top side to provide access to the interior cavity. A second access door disposed on the housing left side between the first access door, the rear side, and the bottom side releasably covers a portion of the interior compartment. An exterior compartment disposed on the rear side proximal to the lid accommodates the retractable first handle. At least one second handle is vertically disposed on the housing front side proximal to the housing bottom side and beneath the drawers when the apparatus is positioned in an upright position to facilitate the moving of the apparatus to a desired location other than by using the first handle. A third handle is disposed on each of the drawers. A lock is disposed on each of the first access door, the second access door, the lid forward side, and the housing front side, the lock for which lockingly engages all drawers simultaneously.

The present wheeled firearms transport case eases the transport of multiple rifles and handguns as well as ammunition and miscellaneous firearm accessories, such as cartridges, cleaning supplies, eye and ear protectors, tools, and targets to a destination, such as a firing range or a hunting event site, by containing all of the foregoing items in a single case. However, the present case may also be used to transport jack hammers, large drills, and breakable industrial equipment as well as other items.

Thus has been broadly outlined the more important features of the present wheeled firearms transport case so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
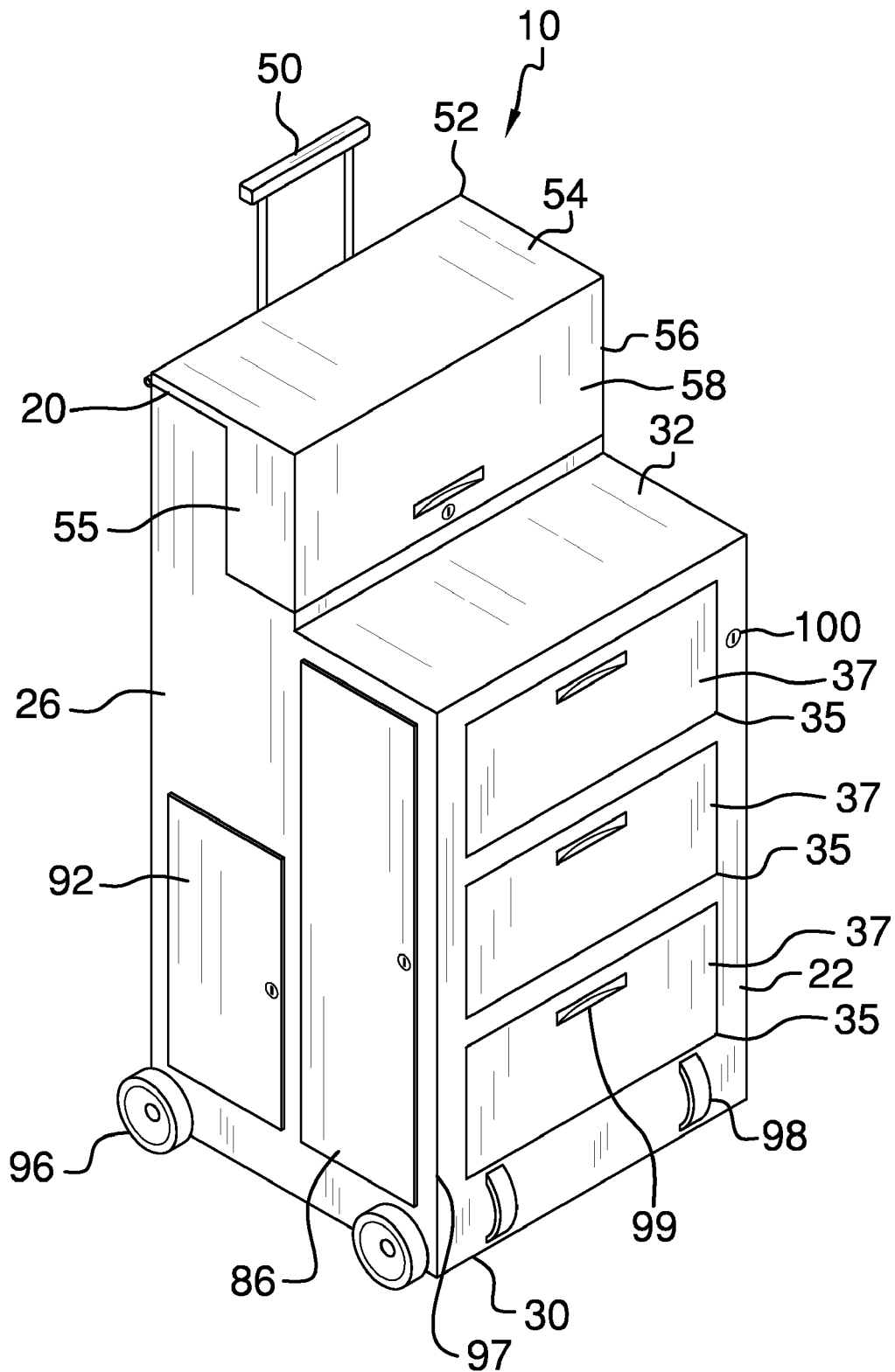
FIG. 1 is an isometric view.
Figure 2:
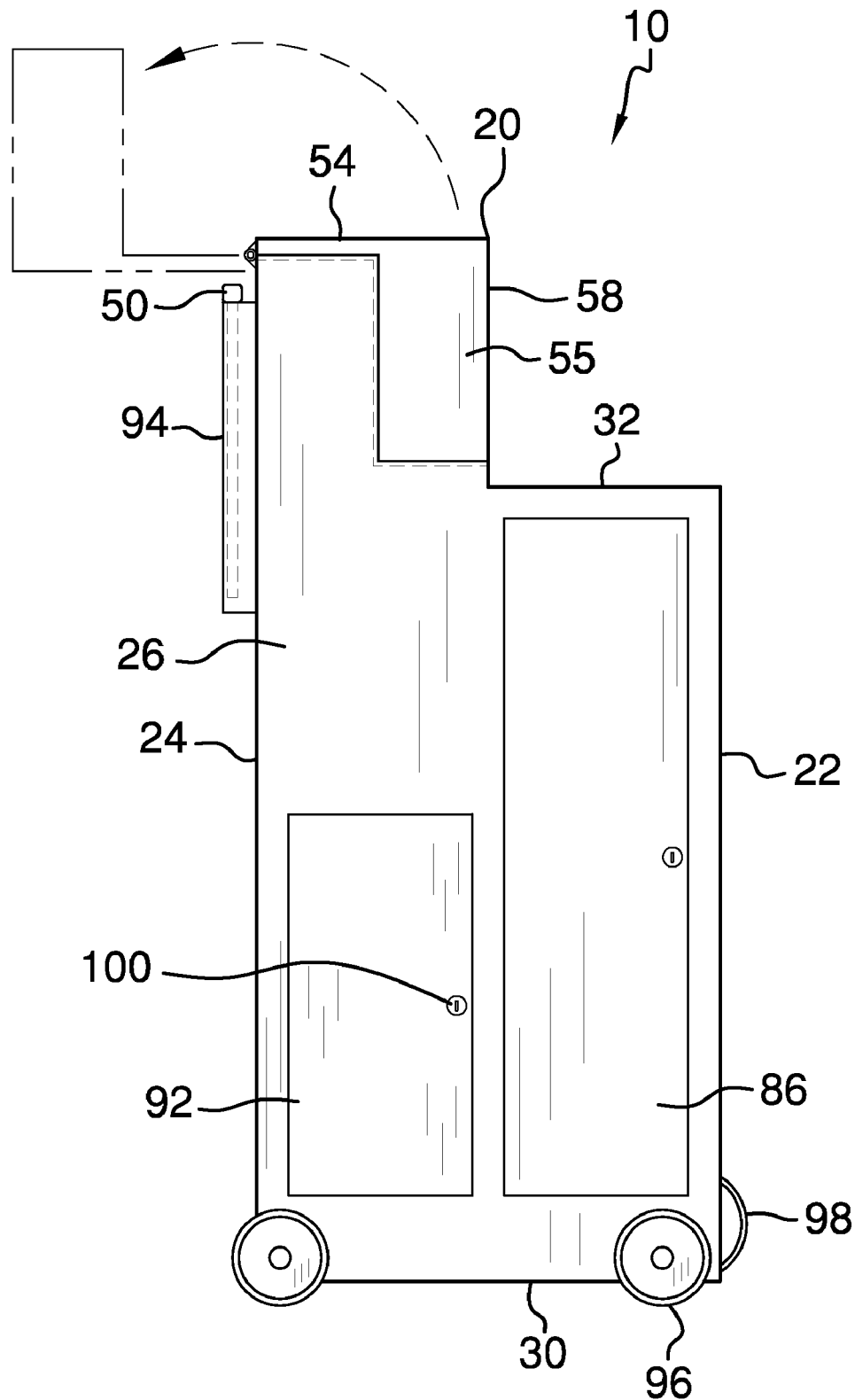
FIG. 2 is a side elevation view.
Figure 3:
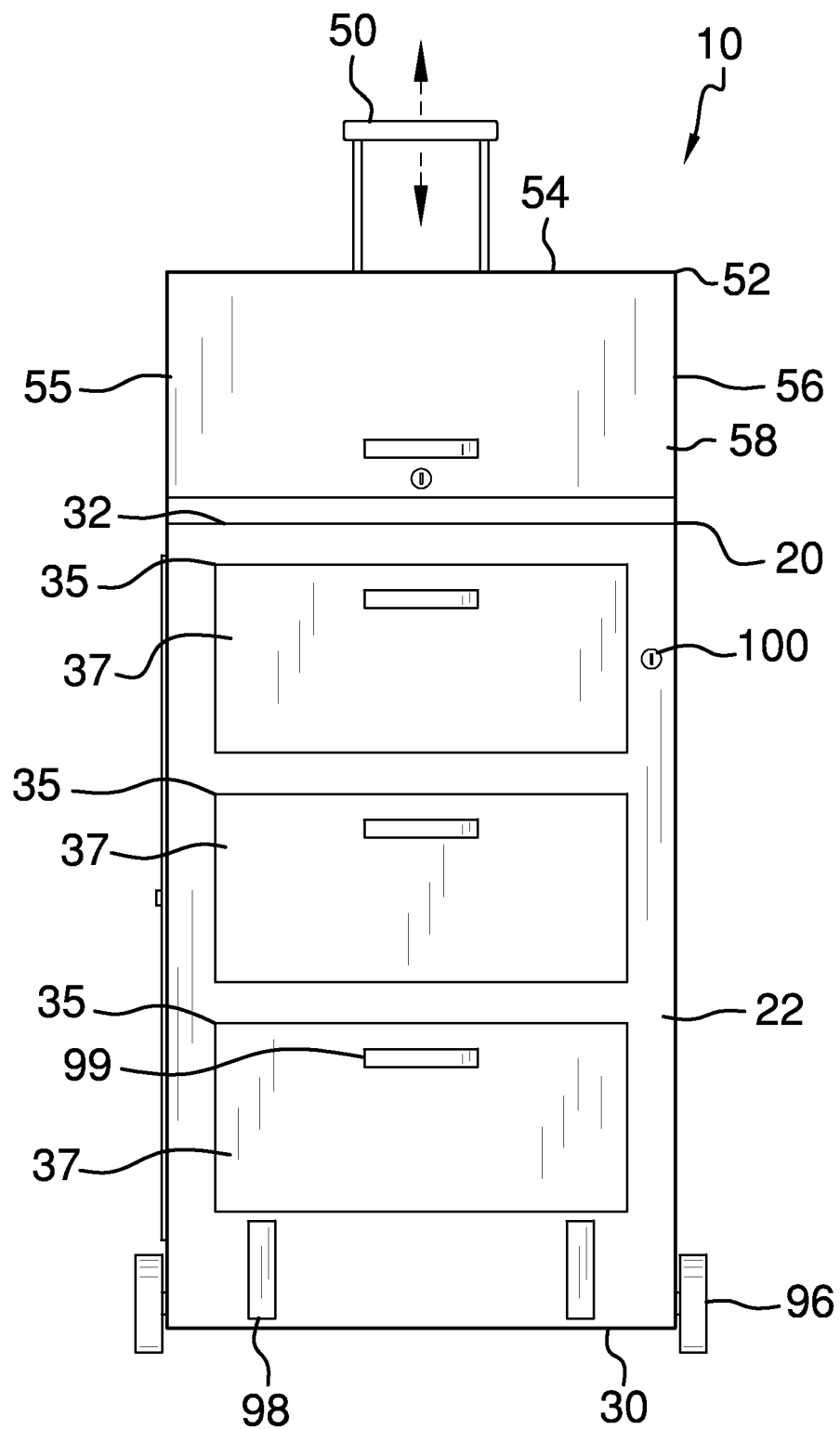
FIG. 3 is a front elevation view.
Figure 4:
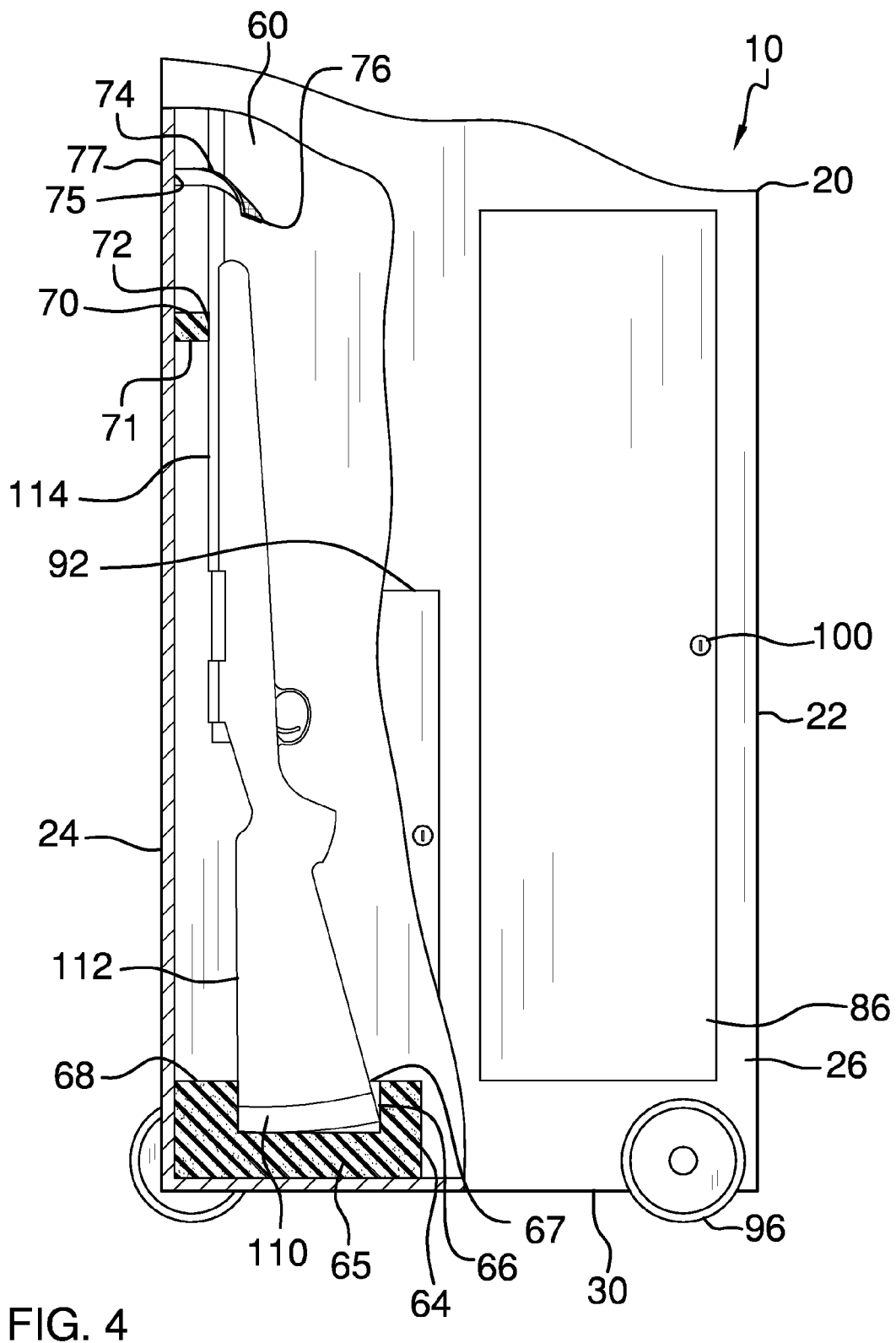
FIG. 4 is an in-use side elevation view with a partial cutaway.
Figure 5:
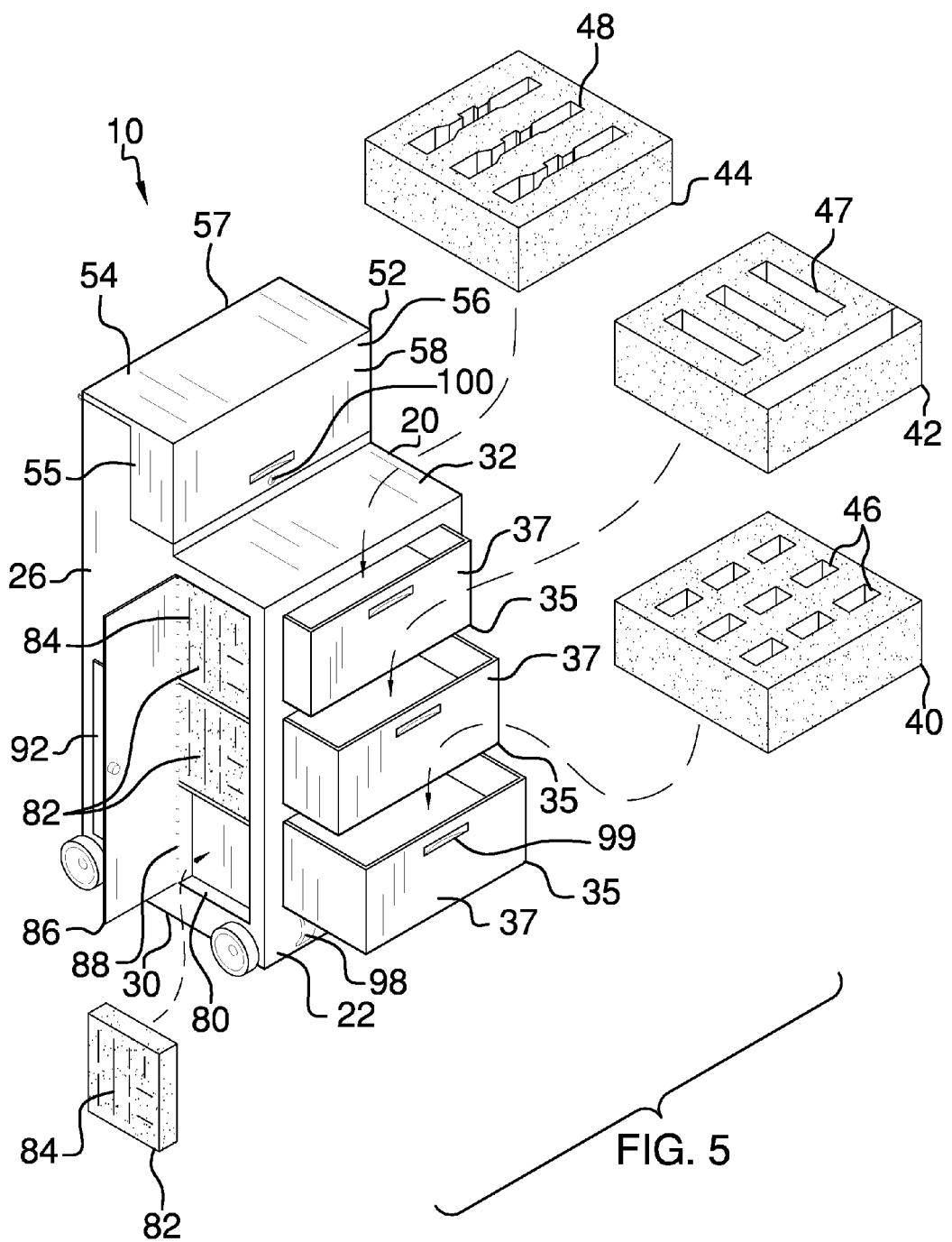
FIG. 5 is an exploded isometric view.
Figure 6:
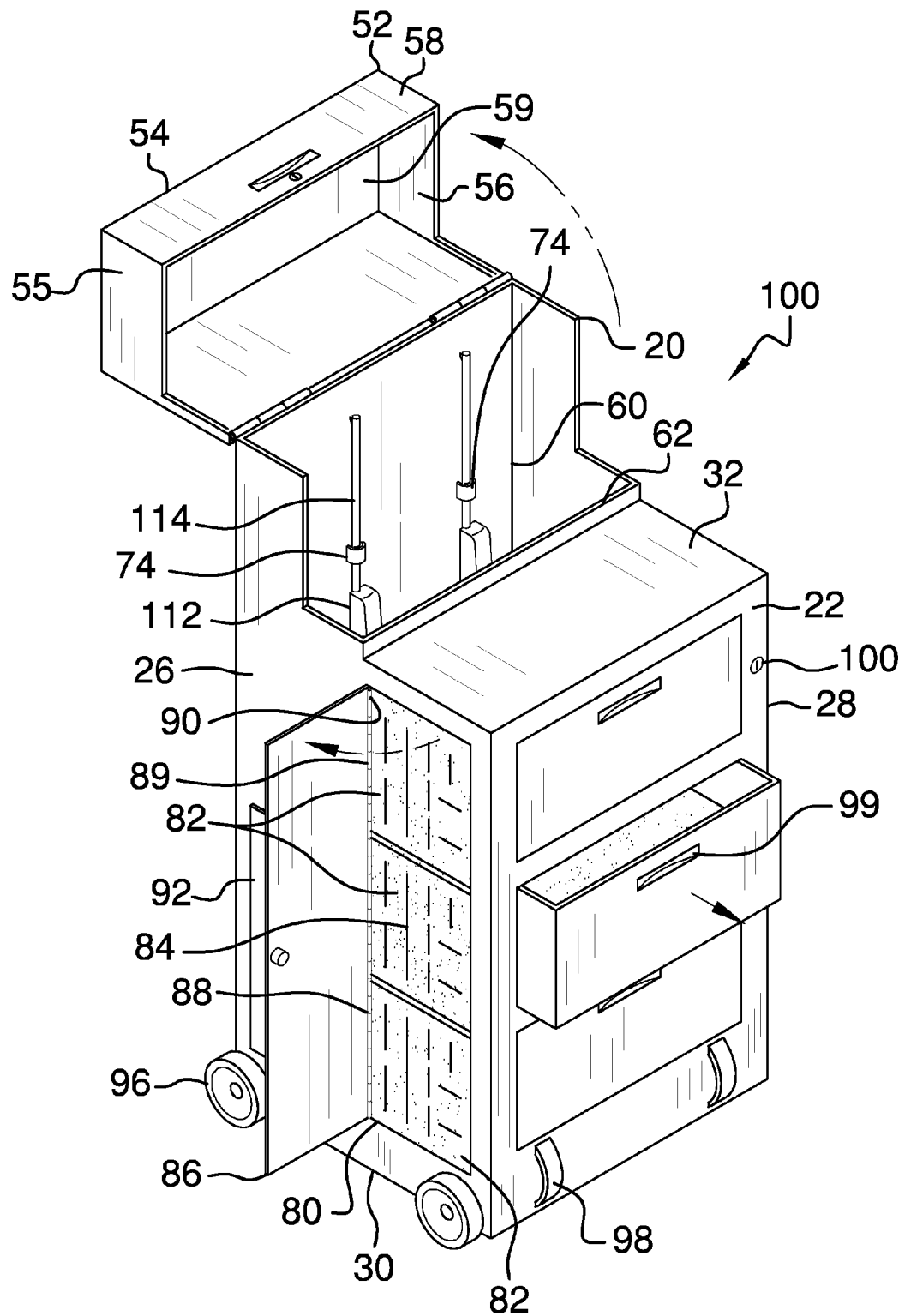
FIG. 6 is an in-use isometric view with a top door, a side door, and a drawer in an open position.

With reference now to the drawings, and in particular FIGS. 1 through 6 thereof, example of the instant wheeled firearms transport case employing the principles and concepts of the present wheeled firearms transport case and generally designated by the reference number will be described.

Referring to FIGS. 1 through 6 a preferred embodiment of the present wheeled firearms transport case 10 is illustrated. The wheeled firearms transport case 10 includes a housing 20 having a front side 22, a rear side 24, a substantially L-shaped left side 26, a substantially L-shaped right side 28, a bottom side 30, and a top side 32. The top side 32 extends from the front side 22 to a central horizontal axis extending from the left side 26 to the right side 28. A plurality of vertically aligned drawers 35 is slidingly disposed within the housing 20. Each of the drawers 35 has a front wall 37 slidingly disposed on the front side 22. There are three drawers 35 in the wheeled firearms transport case 10 shown. A cushioned first insert 40, a cushioned second insert 42, and a cushioned third insert 44 are also included. Each of the first, second, and third inserts 40, 42, 44 are removably disposed within one of the drawers 35. A plurality of parallelepiped first cavities 46 is disposed within the first insert 40. Each of the first cavities 46 is configured to removably receive an ammunition box therein. A plurality of elongated second cavities 47 is disposed within the second insert 42. Each of the second cavities 47 has a length longer than a length of the each of the first cavities 46. Each of the second cavities 47 is configured to removably receive a handgun therein. A plurality of third cavities 48 is disposed within the third insert 44. Each of the third cavities 48 is configured to removably receive a rifle scope therein. The removability of the first, second, and third inserts 40, 42, 44 permits interchanging of the first, second and inserts 40, 42, 44 as desired into the drawers 35 and also permits the user to remove the first, second, and third inserts 40, 42, 44 while protecting the contents thereof. A first handle 50 is disposed on the housing 20 rear side 24 proximal to a lid 52. The first handle 50 is retractable. The retractability of the first handle 50 allows the first handle 50 to be exposed to roll the apparatus 10 to a desired location while also allowing the first handle 50 to be retracted and thus preventing the first handle 50 from being broken while the present apparatus 10 is in a fixed position with the rear side 24 exposed, rather than against a wall.

A lid 52 is disposed between the top side 32 and the housing 20 rear side 24. The lid 52 has an upper wall 54, a first side 55, a second side 56, a rearward side 57 hingedly attached to the housing 20 rear side 24, a forward side 58, and an internal cavity 59 disposed therein. The rearward side 57 has a longer length than a length of the forward side 58 so that the lid 52 conforms to the L-shaped housing 20 left and right sides 26, 28.

An interior compartment 60 is disposed within the housing 20 between the drawers 35, the housing 20 rear side 24, the left side 26, the right side 28, and the lid 52. The interior compartment 60 has a forward wall 62 disposed between the left side 26, the right side 28, and the drawers 35. A cushioned rifle butt cradle member 64 is disposed within the interior compartment 60 between the housing 20 bottom side 30 and the rear side 24. The rifle butt cradle member 64 includes a parallelepiped body 65 having a notch 66 disposed therein. The notch 66 has an open side 67 disposed on an upper edge 68 of the body 65. The body 65 notch 66 is configured to removably receive a rifle butt 110 therein. The rifle butt cradle member 64 protects the rifle butt 110 from damage during transport while also assisting in securing the rifle 112 in an upright position within the interior compartment 60.

At least one cushioned guide support 70 is disposed within the interior compartment 60. The guide support 70 has an external wall 71 attached to the housing 20 rear side 24 and an internal wall 72 configured to abut a rifle barrel 114. In addition, at least one strap 74 of hook and loop fastening is disposed within the interior compartment 60. Each strap 74 has an outer edge 75 and an inner edge 76. The outer edge 75 is attached to housing 20 rear side 24 between the guide support 70 and an upper rear edge 77 of the interior compartment 60. The inner edge 76 releasably engages the outer edge 75. Each strap 74 is configured to releasably retain a rifle barrel 114 therethrough. One of the guide supports 70 and one of the straps 74 assists the rifle butt cradle member in securing a rifle in an upright position within the interior compartment 60.

An elongated interior cavity 80 is disposed within the housing 20 left side 26 between the interior compartment 60 forward wall 62 and the housing 20 front side 22. Vertically aligned cushioned fourth inserts 82 are removably disposed within the interior cavity 80. A plurality of slits 84 is disposed within each of the fourth inserts 82. The slits 84 vary in length to accommodate various firearm accessories such as targets, tools, eye protectors, and ear protectors. A first access door 86 is hingedly disposed on the housing 20 left side 26 proximal to the front side 22 and the top side 32. A first hinge 88 is disposed on an interior edge 89 of the first access door 86 and is hingedly attached to a left edge 90 of the interior cavity 80. A second access door 92 is disposed on the housing 20 left side 26 between the first access door 86, the rear side 24, and the bottom side 30. The second access door 92 releasably covers a portion of the interior compartment 80. The second access door 92 has a shorter length than a length of the first access door 86.

An exterior compartment 94 is disposed on the rear side 24 proximal to the lid 52. The first handle 50 vertically slidingly engages the exterior compartment 94.

A wheel 96 is disposed proximal to each of a corner 97 disposed between the front side 22 and left side 26, the left side 26 and the rear side 24, the rear side 24 and the right side 28, and the right side 28 and the front side 22. The present apparatus 10 also includes at least one C-shaped second handle 98 vertically disposed on the housing 20 front side 22 proximal to the housing 20 bottom side 30 and beneath the drawers 35 when the apparatus 10 is positioned in an upright position to facilitate the moving of the apparatus to a desired location other than by using the first handle 50. A third handle 99 is disposed on each of the drawers 35. The third handle 35 is recessed into the drawer 35 front wall 37.

A lock 100 is disposed on each of the first access door 86, the second access door 92, the lid 52 forward side 58, and the housing 20 front side 22. The lock 100 disposed on the housing 20 front side 22 lockingly engages all drawers 35.

The cushioned first, second, third, and fourth inserts 40, 42, 44, 82 and the rifle butt cradle member 64 are foam. The cushioned guide support 70 is rubber.

What is claimed is:
1. A wheeled firearms transport case comprising:
   a housing having a front side, a rear side, a substantially L-shaped left side, a substantially L-shaped right side, a bottom side, and a top side, wherein the top side extends from the front side to a central horizontal axis extending from the left side to the right side;
   a plurality of vertically aligned drawers slidingly disposed within the housing, each of the drawers having a front wall slidingly disposed on the front side;
   a cushioned first insert, a cushioned second insert, and a cushioned third insert, wherein each of the first, second, and third inserts are removably disposed within one of the drawers;
   a plurality of parallelepiped first cavities disposed within the first insert, wherein each of the first cavities is configured to removably receive a box containing ammunition therein;
   a plurality of elongated second cavities disposed within the second insert, wherein each of the second cavities have a length longer than a length of the each of the first cavities, further wherein each of the second cavities is configured to removably receive a handgun therein;

a plurality of third cavities disposed within the third insert, wherein each of the third cavities is configured to removably receive a rifle scope therein;
a lid disposed between the top side and the housing rear side, the lid having an upper wall, a first side, a second side, a rearward side hingedly attached to the housing rear side, a forward side, and an internal cavity disposed therein, wherein the rearward side has a longer length than a length of the forward side;
an interior compartment disposed within the housing between the drawers, the housing rear side, the right side, the left side, and the lid, wherein the interior compartment has a forward wall disposed between the right side, the left side, and the drawers;
a first handle disposed on the housing rear side proximal to the lid;
an elongated interior cavity disposed within the housing left side between the interior compartment forward wall and the housing front side;
a plurality of vertically aligned cushioned fourth inserts removably disposed within the interior cavity;
a plurality of slits disposed within each of the fourth inserts;
a first access door hingedly disposed on the housing left side proximal to the front side and the top side;
a first hinge disposed on an interior edge of the first access door, wherein the first hinge is hingedly attached to a left edge of the interior cavity; and
a second access door disposed on the housing left side between the first access door, the rear side, and the bottom side, wherein the second access door releasably covers a portion of the interior compartment.

2. The wheeled firearms transport case of claim 1 further comprising:
at least one cushioned rifle butt cradle member disposed within the interior compartment between the housing bottom side and the rear side, each rifle butt cradle member comprising:
a parallelepiped body having a notch disposed therein, the notch having an open side disposed on an upper edge of the body; and
wherein the body notch is configured to removably receive a rifle butt therein.

3. The wheeled firearms transport case of claim 2 further comprising:
at least one cushioned guide support disposed within the interior compartment, each guide support having an external wall attached to the housing rear side and an internal wall configured to abut a rifle barrel.

4. The wheeled firearms transport case of claim 3 further comprising:
at least one strap of hook and loop fastening disposed within the interior compartment, each strap having an outer edge and an inner edge;
wherein the outer edge is attached to housing rear side between the guide support and an upper rear edge of the interior compartment;
wherein the inner edge releasably engages the outer edge; and
wherein each strap is configured to releasably retain a rifle barrel therethrough.

5. The wheeled firearms transport case of claim 4 further comprising:
an exterior compartment disposed on the rear side proximal to the lid;
wherein the first handle is retractable; and
wherein the first handle vertically slidingly engages the exterior compartment.

6. The wheeled firearms transport case of claim 5 further comprising:
a wheel disposed proximal to each of a corner disposed between the front side and left side, the left side and the rear side, the rear side and the right side, and the right side and the front side.

7. The wheeled firearms transport case of claim 6 further comprising:
at least one second handle vertically disposed on the housing front side proximal to the housing bottom side.

8. The wheeled firearms transport case of claim 7 further comprising:
a third handle disposed on the front wall of each of the drawers.

9. The wheeled firearms transport case of claim 8 wherein the second access door has a shorter length than a length of the first access door.

10. The wheeled firearms transport case of claim 9 wherein the first, second, third, and fourth inserts and each rifle butt cradle member are foam; and
wherein each guide support is rubber.

11. A wheeled firearms transport case comprising:
a housing having a front side, a rear side, a substantially L-shaped left side, a substantially L-shaped right side, a bottom side, and a top side, wherein the top side extends from the front side to a central horizontal axis extending from the left side to the right side;
a plurality of vertically aligned drawers slidingly disposed within the housing, each of the drawers having a front wall slidingly disposed on the front side;
a cushioned first insert, a cushioned second insert, and a cushioned third insert, wherein each of the first, second, and third inserts are removably disposed within one of the drawers;
a plurality of parallelepiped first cavities disposed within the first insert, wherein each of the first cavities is configured to removably receive a box containing ammunition therein;
a plurality of elongated second cavities disposed within the second insert, wherein each of the second cavities have a length longer than a length of the each of the first cavities, further wherein each of the second cavities is configured to removably receive a handgun therein;
a plurality of third cavities disposed within the third insert, wherein each of the third cavities is configured to removably receive a rifle scope therein;
a lid disposed between the top side and the housing rear side, the lid having an upper wall, a first side, a second side, a rearward side hingedly attached to the housing rear side, a forward side, and an internal cavity disposed therein, wherein the rearward side has a longer length than a length of the forward side;
an interior compartment disposed within the housing between the drawers, the housing rear side, the right side, the left side, and the lid, wherein the interior compartment has a forward wall disposed between the right side, the left side, and the drawers;
a first handle disposed on the housing rear side proximal to the lid;
an elongated interior cavity disposed within the housing left side between the interior compartment forward wall and the housing front side;
a plurality of vertically aligned cushioned fourth inserts removably disposed within the interior cavity;

a plurality of slits disposed within each of the fourth inserts;
a first access door hingedly disposed on the housing left side proximal to the front side and the top side;
a first hinge disposed on an interior edge of the first access door, wherein the first hinge is hingedly attached to a left edge of the interior cavity;
a second access door disposed on the housing left side between the first access door, the rear side, and the bottom side, wherein the second access door releasably covers a portion of the interior compartment;
at least one cushioned rifle butt cradle member disposed within the interior compartment between the housing bottom side and the rear side, each rifle butt cradle member comprising:
 a parallelepiped body having a notch disposed therein, the notch having an open side disposed on an upper edge of the body;
 wherein the body notch is configured to removably receive a rifle butt therein;
at least one cushioned guide support disposed within the interior compartment, each guide support having an external wall attached to the housing rear side and an internal wall configured to abut a rifle barrel;
at least one strap of hook and loop fastening disposed within the interior compartment, each strap having an outer edge and an inner edge;
wherein the outer edge is attached to housing rear side between the guide support and an upper rear edge of the interior compartment;
wherein the inner edge releasably engages the outer edge;
wherein each strap is configured to releasably retain a rifle barrel therethrough;
an exterior compartment disposed on the rear side proximal to the lid;
wherein the first handle is retractable;
wherein the first handle vertically slidingly engages the exterior compartment;
a wheel disposed proximal to each of a corner disposed between the front side and left side, the left side and the rear side, the rear side and the right side, and the right side and the front side;
at least one second handle vertically disposed on the housing front side proximal to the housing bottom side;
a third handle disposed on the front wall of each of the drawers; and
a lock disposed on each of the first access drawer, the second access drawer, the lid forward side, and the housing front side, wherein the lock disposed on the housing front side lockingly engages all drawers.

12. The wheeled firearms transport case of claim 11 wherein the second access door has a shorter length than a length of the first access door.

13. The wheeled firearms transport case of claim 12 wherein the first, second, third, and fourth inserts and each rifle butt cradle member are foam; and
 wherein each guide support is rubber.

* * * * *